United States Patent [19]

Takai

[11] 3,978,299

[45] Aug. 31, 1976

[54] LIQUID-LEVEL DETECTING DEVICE
[75] Inventor: Norio Takai, Kariya, Japan
[73] Assignee: Nippondenso Co., Ltd., Kariya, Japan
[22] Filed: May 29, 1975
[21] Appl. No.: 581,887

[30] Foreign Application Priority Data
June 7, 1974 Japan............... 49-66549[U]

[52] U.S. Cl................. 200/84 C; 335/208; 335/146
[51] Int. Cl.² ........................... H01H 35/40
[58] Field of Search................ 335/208, 146, 217; 200/84 C; 340/244 A, 59, 244 B; 73/308, 313

[56] References Cited
UNITED STATES PATENTS
3,750,064  7/1973  Kato et al................. 335/208
3,846,747  11/1974  Arai et al................. 340/59

Primary Examiner—David Smith, Jr.
Attorney, Agent, or Firm—Cushman, Darby & Cushman

[57] ABSTRACT

A liquid-level detecting device comprises a float for moving in accordance with the liquid level, a permanent magnet mounted in said float and a reed switch which is fixed to a stationary member and arranged for opening and closing in accordance with the movement of said permanent magnet and a thermoferrite member which is provided near said permanent magnet. The thermoferrite member has a Curie point at a critical temperature where it loses its magnetism thereby cutting an affection of said permanent magnet to said reed switch.

2 Claims, 7 Drawing Figures

LIQUID-LEVEL DETECTING DEVICE

BACKGROUND OF THE INVENTION

This invention relates to a liquid-level detecting device especially for lubricating oil in an engine of an automobile.

The level of the lubricating oil of the engine in operation in which the oil is pressurized and distributed to various parts of the engine is different from that of the engine standing still in which all the oil return to an oil pan. When the engine is started, the oil level gradually decreases from the level L0 which indicates original level before the engine is started to the level L1 which indicates the level in the stable operation as shown in FIG. 1. However, since the oil temperature is generally low at the starting and the oil has relatively high viscosity, the distributed oil can not readily return to the oil pan, resulting in temporary decrease of the level below the aforementioned level L1, thereby causing a misindication of the oil level as for as the conventional detecting devices which are designed to alarm when the level has decreased below the level L1 are utilized.

SUMMARY OF THE INVENTION

It is a primary object of the present invention to provide a liquid-level detecting device for detecting a critical level of the liquid to be alarmed in accordance with the engine temperature, i.e., when the temperature is in a definite range, the detector does not function, even if the liquid level is at a position to be detected. Further object of the present invention is to provide such a liquid-level detecting device with low manufacturing cost.

The other objects and advantages of the present invention will become apparent from the following detailed description of the preferred embodiments.

DETAILED DESCRIPTION OF THE PREFERRED EMBODIMENT

Figure 1:
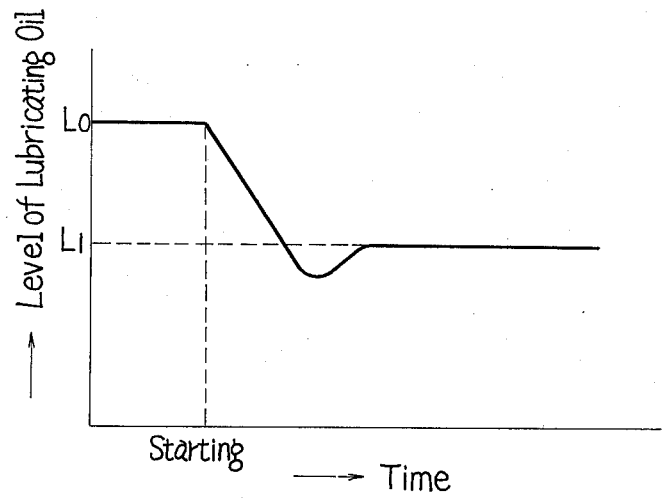
FIG. 1 is a graph showing a relationship between the level of lubricating oil in the engine and the engine operation time.
Figure 2:
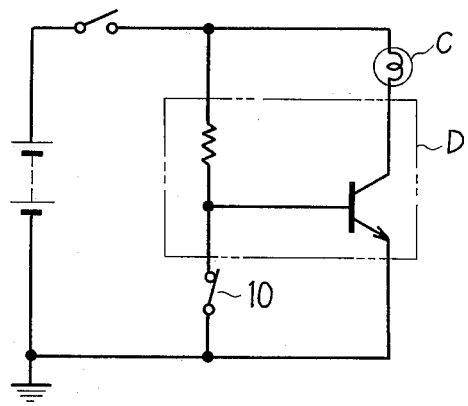
FIG. 2 shows an electrical circuit for the liquid-level detecting device of the present invention.
Figure 3:
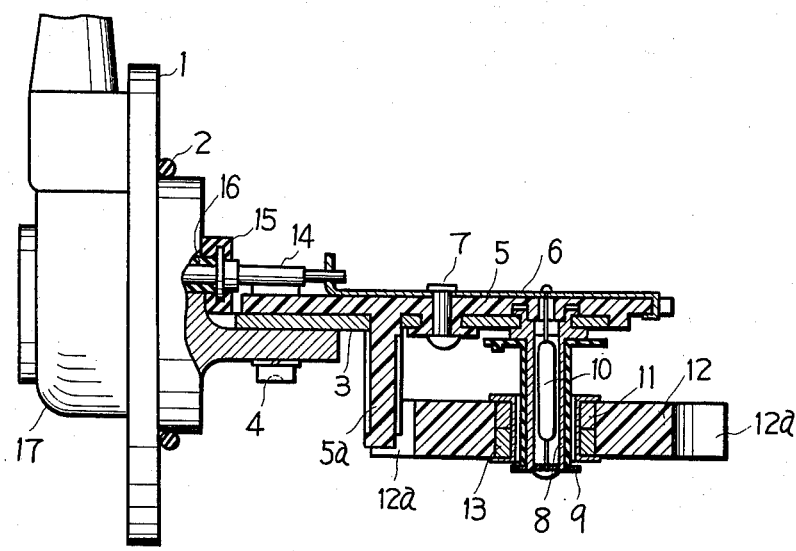
FIG. 3 shows a partial cross sectional view of the liquid-level detecting device of the present invention.
Figure 4:
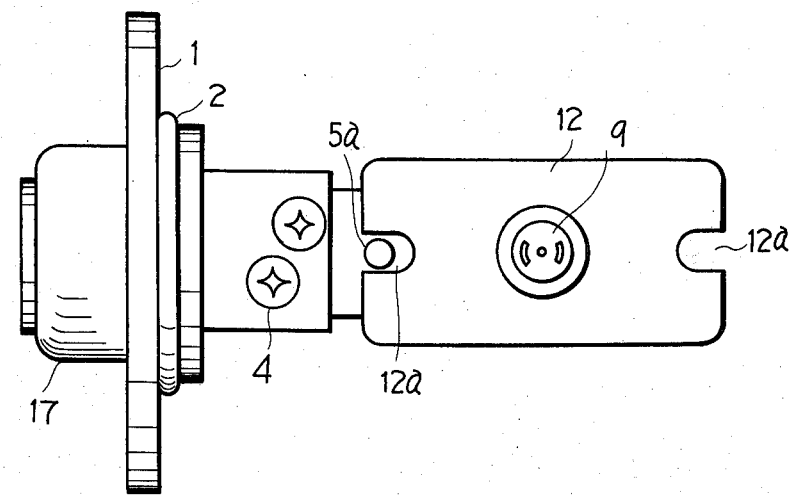
FIG. 4 shows a plane view of the liquid-level detecting device of the present invention.

The liquid-level detecting device of the present invention will be explained with reference to FIGS. 2, 3 and 4. A retaining member 1 made of a conductive metal, such as aluminum, is fixed to a side wall of an oil pan (not shown) with a shield ring 2. A supporting plate 3 made of conductive metal is fixed by screws 4 to the retaining member 1 and extends horizontally into the interior of the oil pan. An insulating plate 5 made of, for example, synthetic resin, is fixed by revets 7 and interposed between a connecting plate 6 made of conductive metal, such as brass, and the supporting plate 6. A reed switch container 8 made of nonmagnetic conductive metal, such as brass, is fixed to the supporting plate 3 at its upper end, and has a stopper 9 at the other end. A reed switch 10 is held in the container 8, one terminal of which is welded to the connecting plate 6. The other terminal of the reed switch 10 is welded to the stopper 9, which is grounded through the container 8, supporting plate 3 and retaining member 1. A float 12 moves up and down in accordance with the level of the oil. The float has a ring-shaped permanent magnet 13 and thermoferrite ring 11 therein, which is slidable on the container 8 to operate the reed switch 10. The thermoferrite ring 11 has a Curie point at a certain temperature, for example, 60°C. The float 12 has, further, a notch 12a which engages with a projection 5a to prevent the float from turning. A terminal 14 is welded to the connecting plate 6, whereby the reed switch 10 is connected to an amplifier D shown in FIG. 2 through a lead wire (not shown). Insulating members 15 and 16 insulate the terminal 14 from the retaining member 1. A rubber cap 17 protects the electrical parts from water and dust. A rubber bush 18 is provided for preventing wear from occurring on the float 12 and container 8 owing to the reciprocal movement of the float 12.

Figure 5A:
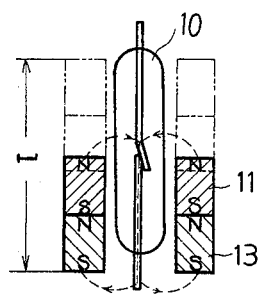
FIG. 5a shows a schematic view of the principal elements of the present invention in the condition in which the temperature is below the definite value.
Figure 5B:
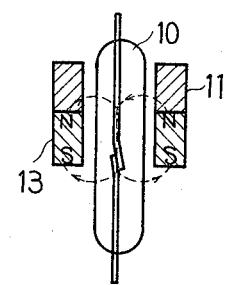
FIG. 5b shows a schematic view of the principal elements of the present invention in the condition in which the temperature is above a critical value and the float is upper position.
Figure 5C:
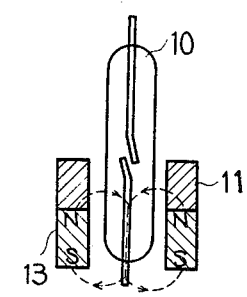
FIG. 5c shows a schematic view of the principal elements of the present invention in the condition in which the temperature is above a critical value and the float is lower position.

The operation of the above detecting device is explained with reference to FIGS. 2, 5a, 5b and 5c. When the engine is started, since the temperature of the oil is below the Curie point of the thermoferrite ring 11, it is magnetized by the permanent magnet 13, as if they form a unitary magnet as shown in FIG. 5a, in which the letter l indicates the range of movement of the float 12. In this condition, the magnetic flux of the permanent magnet 13 penetrates the reed switch 10 regardless of the position of the float 12 to close the reed switch 10. Since, the reed switch 10 is connected to the control circuit of a transistor which energizes an alarm C when the reed switch 10 is opened as shown in FIG. 2, the detecting device does not sense the critical level for alarm in such a condition. On the other hand, when the engine has been warmed up and its temperature rises over the Curie point, the thermoferrite loses its ferromagnitism and the permanent magnet 13 solely works as a magnet. As a result the reed switch 10 is closed when the oil level is relatively high as shown in FIG. 5a and is opened when the level falls down below the level L1 as shown in FIG. 5c.

In the above embodiments, although the reed switch 10 opens when the liquid-level falls below the level L1, a modification in which the reed switch closes when the liquid-level falls below L1 could be possibly substituted therefor.

It will be understood that other modifications may be made without departing from the spirit of the present invention.

What I claim is:

1. A liquid-level detecting device comprising:
   a supporting member,
   a float for moving in accordance with liquid-level with respect to said supporting member,
   a permanent magnet mounted in said float,
   a reed switch fixed to said supporting member and arranged to open and close in accordance with the movement of said permanent magnet thereby to detect the liquid-level, and a thermoferrite member, provided near said permanent magnet, for cutting an effect of said permanent magnet to said reed switch in a definite temperature range.

2. A liquid-level detecting device as claimed in claim 1, wherein said permanent magnet and said thermoferrite member are placed side by side with said thermoferrite member being upperside of said permanent magnet with respect to a moving direction of said float, whereby said reed switch is closed when the temperature is below said Curie point, while said reed switch is opened when the temperature is above said Curie point.

* * * * *